INVENTOR.
RALPH A. PROUD, JR.
BY
Marechal, Biebel, French & Bugg
ATTORNEYS

United States Patent Office 3,357,327
Patented Dec. 12, 1967

3,357,327
TABULATION AND LEADER INSERTION FOR PHOTOTYPESETTING SYSTEM

Ralph A. Proud, Jr., Somerset, N.J., assignor to Harris-Intertype Corporation, Cleveland, Ohio, a corporation of Delaware Filed May 12, 1965, Ser. No. 455,120
5 Claims. (Cl. 95—4.5)

This invention relates to phototypesetting systems, and particularly to devices for performing tabulating operations and for insertion of leader characters, such as dots or dashes.

The present invention is particularly concerned with automatically operable phototypesetting machines controlled by a record in which the sequence of operations of the machine is recorded in code form. The machine reads or follows this record and causes character images to be formed photographically on photosensitive material, and likewise causes the proper spacing of the character images according to typographic requirements for the production of justified lines of type. As a part of the operation of such machines it is often necessary to perform tabulating operations whereby text material or the like is assembled in a number of columns across the page. In some cases it may also be desired to insert between columns, or between words at opposite sides of a line in a column, so-called leader characters. These characters may be a succession of dots, dashes, or asterisks, or some other suitable figure.

According to the present invention the record which controls the phototypesetting machine is formed to include a succession of tabulate codes, with each tabulate code corresponding to a predetermined amount of spacing. Apparatus for forming such codes automatically in a control record for phototypesetting machines is disclosed in copending application Ser. No. 294,474, filed July 12, 1963, now United States Patent No. 3,218,945, issued Nov. 23, 1965, which is assigned to the assignee of this application.

The present invention thus is directed to a phototypesetting device which will follow such a record, produce the desired space for each tabulate code, and in instances where insertion of leaders has been instructed, the machine will automatically photograph the desired leader character in tabular or other phototypesetting work.

Accordingly, the principal object of this invention is to provide a novel phototypesetting apparatus in which tabular operations are performed completely automatically under the control of a record, and without any significant change in the speed of operation of the machine.

Another object of the invention is to provide improvements in a phototypesetting machine controlled by a perforated record tape, or equivalent, wherein the machine will recognize a particular code identifying a tabulating operation and will produce the desired spacing operation such that the next photographic function occurs at the beginning of a new column.

Another object of the invention is to provide a novel phototypesetting machine in which leader characters are automatically photographed in regularly spaced relation in accordance with control information supplied to the machine.

A further object of the invention is to provide an improved phototypesetting machine wherein leader characters are automatically photographed in regularly spaced relation in the course of performing tabulating operations, or in the course of setting a line of characters where a flush righthand margin is desired and some portion of the line is desired to be filled with leader characters, for example, in relating a name and address in a directory to an associated number at the opposite end of the line.

Other objects and advantages of the present invention will become more apparent from the following description, the accompanying drawings and the appended claims.

In the drawings—

Figure 1:
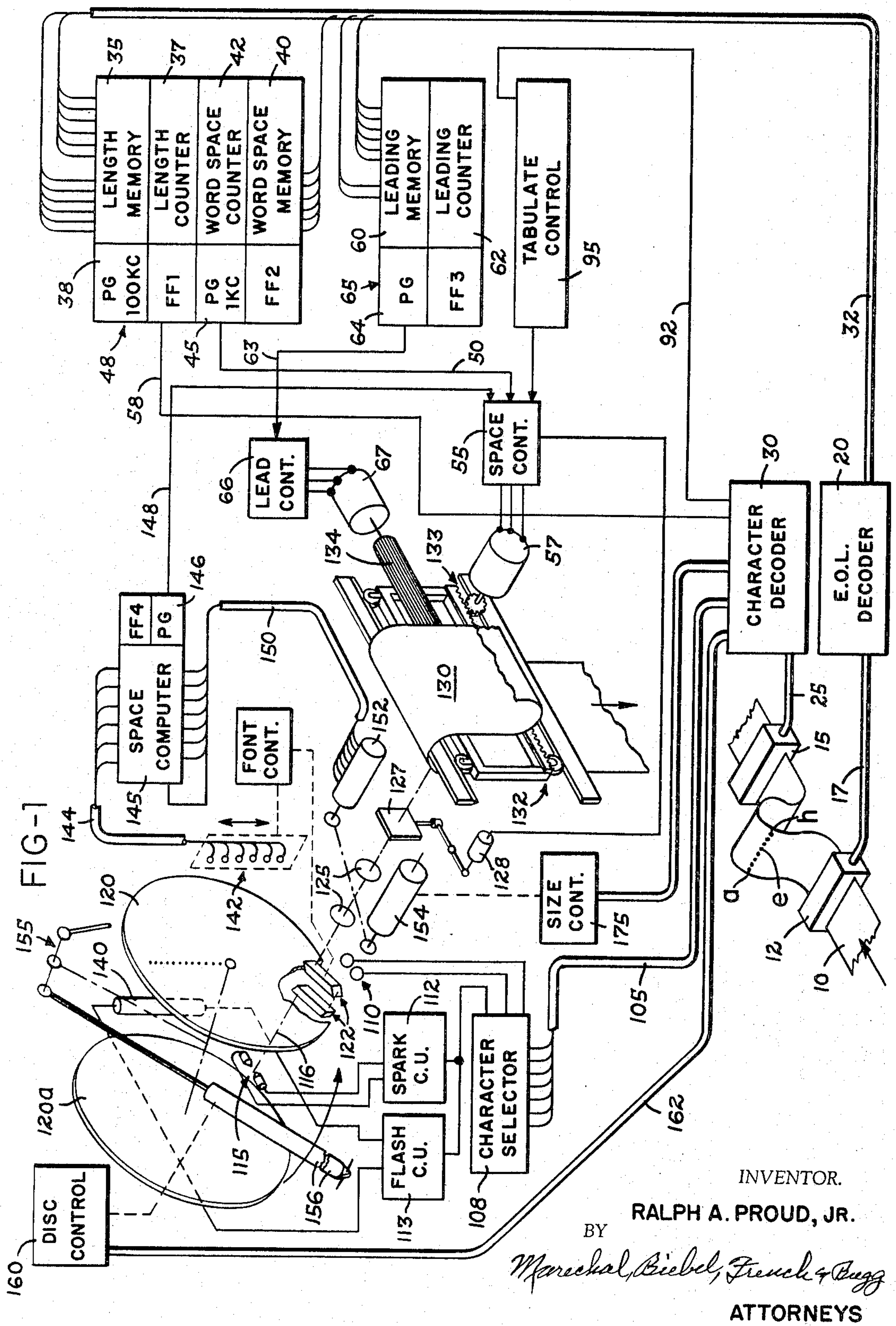
FIG. 1 is a schematic drawing of the basic elements of a phototypesetting machine constructed in accordance with the invention.

Referring to the drawings, which illustrate a preferred embodiment of the invention, FIG. 1 shows the general arrangement of a phototypesetting apparatus embodying the features of the present invention. The apparatus is controlled by a perforated code tape 10, or an equivalent memory or record, and this tape passes through a pair of readers 12 and 15. The direction of travel of the tape is such that it first passes through the reader 12 and then through the reader 15. Both of these readers are preferably of a known type as shown in U.S. Patent No. 3,027,072, called a "star wheel" reader, or a conventional reader of equivalent function.

The reader 12 is arranged to ignore all code words (e.g., a complete group of code perforations across the tape) on the tape except any of the three "end-of-line" codes, which indicate an accepted line, or a rejected line, or a non-justified line. The output contacts of reader 12 are connected through a cable 17 to an end-of-line decoder circuit 20. This circuit includes appropriate controls for the drive of the reader 12, and thus will permit the reader to continue to pass tape therethrough until one of the three aforementioned codes appears on the reader. At such time, reader 12 will stop on the appropriate code word while the function operations dictated by the code are completed. This may means that reader 12 will "hold" on a code while an entire line is being composed.

Figure 2:
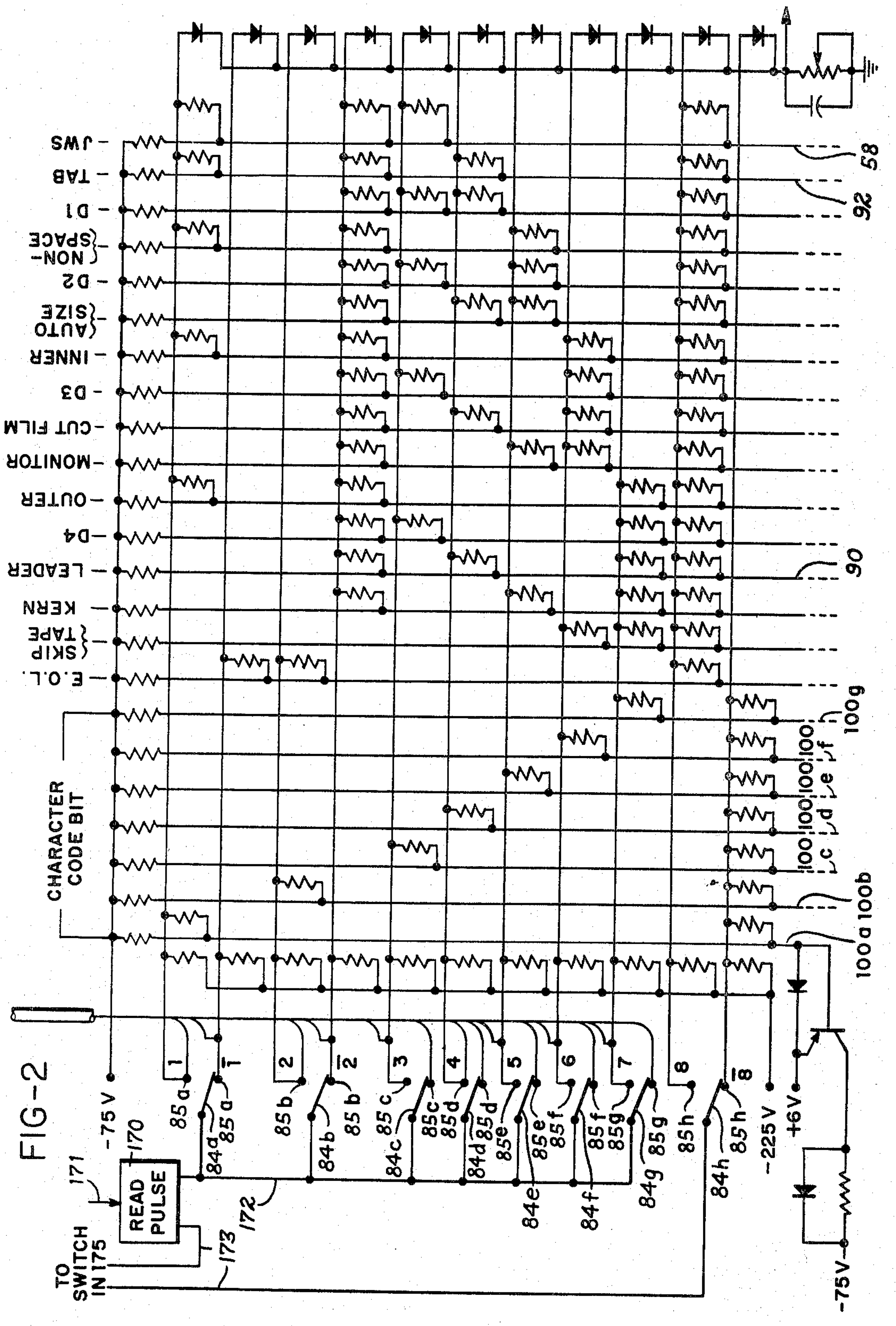
FIG. 2 is a circuit diagram showing details of the character decoder which forms a part of the system shown in FIG. 1.

The reader 15, termed hereafter the "character reader," has its outputs connected through a cable 25 to a separate character decoder circuit 30. The essential details of this circuit are shown in FIG. 2. The circuit includes controls for the drive of reader 15, and these likewise are arranged to stop reader 15, among other reasons, whenever one of the three end-of-line codes appears in the reader. Therefore, reader 15 will stop for example on the end-of-line code for a previously composed line, the reader 12 will stop on the end-of-line code for the line which is to be composed, and the portion or loop of tape between the readers, as shown in FIG. 1, will contain the information necessary to compose a full line of composition.

Details of the end-of-line decoder circuit 20 are unimportant for purposes of explaining the present invention. Suffice to say that the output circuits from this decoder will pass through a cable 32, for example as control voltages applied to one or more wires in the cable, and the wires from the cable are connected to a length memory circuit 35 (for example a conventional memory circuit) which in turn is arranged to preset a length counter 37 upon command. This counter is part of a justification computer which also includes a controlled flip-flop FF1, connected to the length counter, and arranged to connect the output of a 100 kc. pulse generator 38 to the length counter 37.

Likewise, other leads of cable 32 are connected to preset a word space memory circuit 40, into which is set the number of interword spaces in the line being composed, for purposes of justifying computation. The word space memory may likewise be a conventional memory circuit, and is arranged to preset a word space counter 42 which cooperates with the length counter 37 in making the justifying computation. Control over the justifying computing operation is exercised by a control flip-flop FF2 which in turn switches on or off the 1 kc. pulse generator 45.

For purposes of simplification, the parts 35–45 are shown as subdivisions of an entire block 48, which will hereafter be identified as the justification computer. Its output is in the form of a number of electronic pulses passed through line 50 to the spacing control motor 57 which is driven from the space control circuit 55. This motor and circuit may be of the type disclosed in U.S. Patent No. 3,183,806 issued May 18, 1965.

Whenever the character decoder circuit 30 receives the code for a justified interword space, an appropriate signal is transmitted through the output line 58 of that circuit to the justification computer, and this initiates the operation of the computer whereby the amount of space not occupied by characters in the line of composition, having been set into the length memory 35, is divided by the number of interword spaces set into the word space memory 40. The resulting quotient is expressed in terms of the number of spacing pulses from the justifying computer output through line 50 to the space control circuit 55.

In a similar manner, the cable 32 contains leads arranged to preset a leading memory circuit 60 which in turn is arranged to set up a leading counter 62 controlled by flip-flop circuit FF3. The output of this circuit is through lead 63 from the pulse generator 64 comprising part of the leading computer indicated generally at 65. The output line 63 provides an input to a leading control circuit 66, comparable to the space control circuit 55, as also described in the aforementioned Patent No. 3,183,806. This circuit controls the leading drive motor 67.

The tape 10 is shown in FIG. 1 as a conventional perforated paper tape having eight channels for information, whereby a so-called "eight-bit" code word can be used for recording purposes. These channels are indicated by the letters *a–h*, and further reference thereto will be made with regard to the particular channel, for example 10*e*. The tape is advanced by a sprocket wheel (not shown) incorporated in the reader, it being understood that this reader construction is generally the same for both readers 12 and 15. The drive sprocket has a suitable stepping drive which causes a step-by-step advance of sprocket wheel 70, whereby successive code words on the tape can be presented to the star wheel reading apparatus. It will be understood that a code word comprises a corresponding area in each of the channels 10*a–h*, preferably aligned across the tape, and each code word will comprise a bit of information from a channel according to presence or absence of a hole in the tape.

For each channel there is a reading star wheel mounted on a corresponding lever arm in the reader. Each lever arm has a corresponding contact arm 84*a*–84*h* (FIG. 2), and these arms form electrical circuit contacts each of which moves between related stationary contacts, identified as contacts 85*a*1 and 85$a\bar{1}$ through 85*h*8 and 85$h\bar{8}$. These are shown in FIG. 2 on the input side of the character decoding circuit. The reader, therefore, will present outputs on these contacts according to the position of the corresponding star wheel, and for every code word there will be a possible completed circuit through each lever arm 84*a*–84*h*, differentiating between presence of a hole. Not all of the available output circuits are required, however. Note in FIG. 2 that no circuit is used for $\bar{3}$, $\bar{4}$, $\bar{5}$, $\bar{6}$, or $\bar{7}$.

Each time the reader 15 reads a code word, it will decode this code word and distinguish between a character identification (or character selection) code and a function controlling code. Basically, the difference between these two types of codes is determined by the presence or absence of a hole in the channel 10*h*, i.e., an "8" or "$\bar{8}$" signal.

Referring to FIG. 2, it will be noted that such a condition is represented by a completed circuit between the contact arm 84*h* and the "$\bar{8}$" contact, identified as 85$h\bar{8}$. Presence of an $\bar{8}$ signal (no hole in channel 10*h*) will determine that the code word pertains to selection of a character. Conversely, presence of an "8" signal determines that the code word is for some function control. Various ones of the functions are noted as legends over the corresponding circuit output lines shown in FIG. 2. For example, the E.O.L. (end-of-line) circuit, which is the end-of-line signal, is represented by completed circuits from $\bar{1}$, 2 and 8. These are the significant digits of the end-of-line code word.

Figure 5:
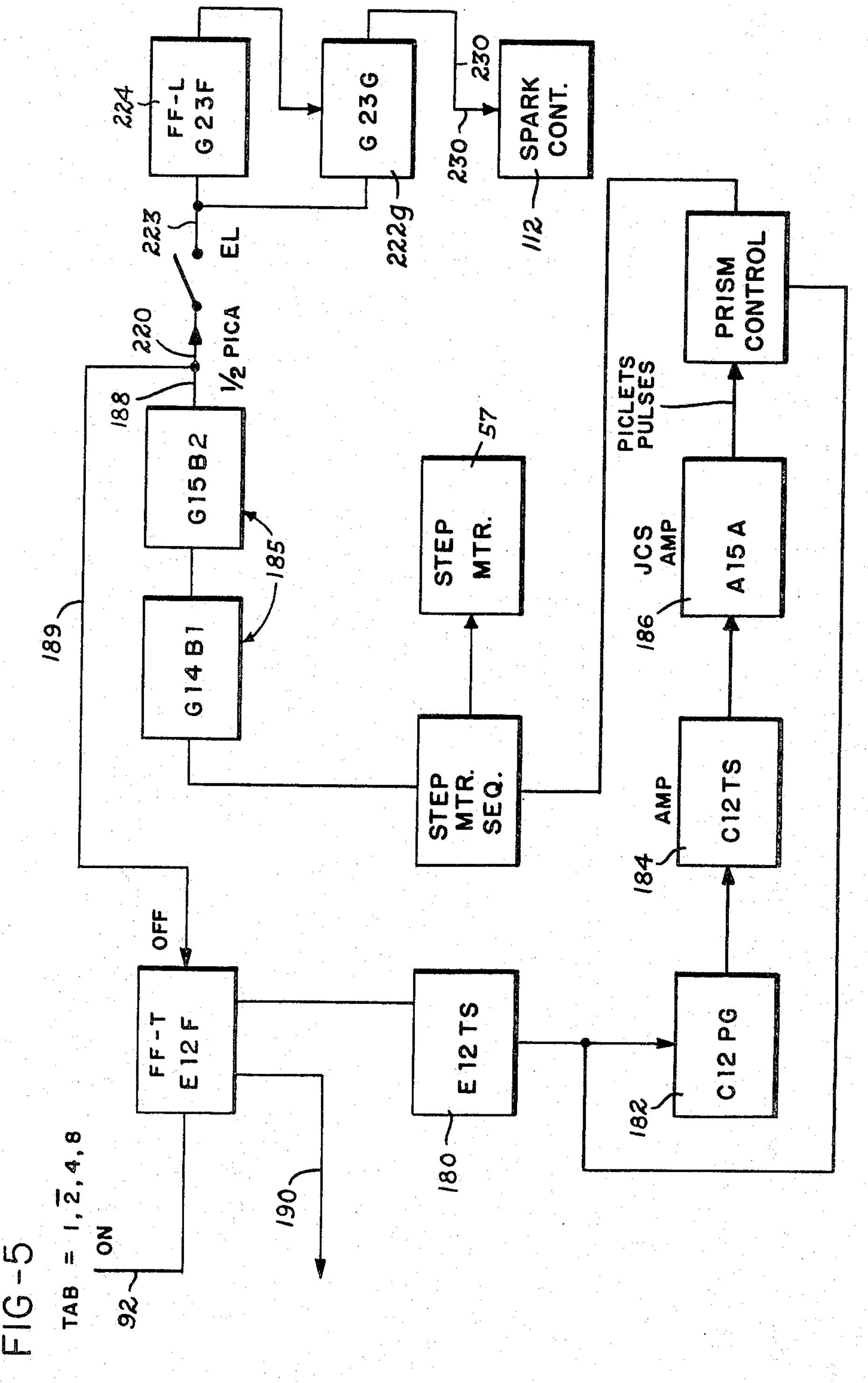
FIG. 5 is a block diagram showing the circuit arrangement for performing the tabulating and leader insertion operations.

The code words and decoding circuits which are particularly significant in the present invention include the circuits identified LEADER, TAB (for tabulate), and JWS (for "justified word space"). The significant digits of the LEADER code are $\bar{2}$, 4, 7 and 8. When the reader reads this particular code word, a control output will result on the leader insert output line 90, leading to the control circuit shown in FIG. 6. The significant digits of the TABULATE code are 1, $\bar{2}$, 4 and 8, and the output line 92 is connected to the tabulate control circuit 95 (FIGS. 1 and 5). The significant digits of the JWS code are 1, $\bar{2}$, 3 and 8. The output line 58 extends from the decoding circuit to the justification computer 48, as previously mentioned.

Figure 6:
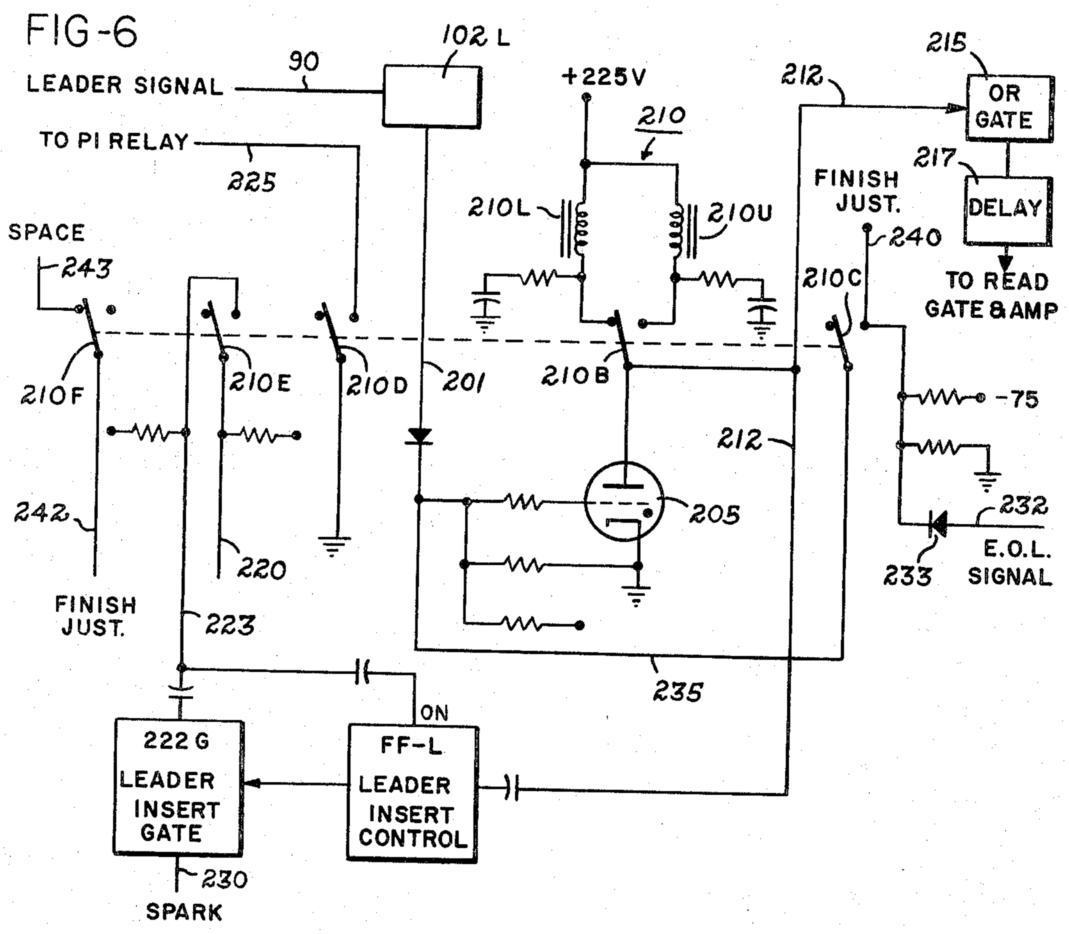
FIG. 6 is a circuit diagram showing details of the leader insert control.

Assuming for purposes of explanation that a character code is presented to the reader 15, then appropriate signals will be presented on one or more of the character code output circuits which are identified in FIG. 2 as 100*a*, 100*b*, 100*c*, 100*d*, 100*e*, 100*f* and 100*g*. Each of the decoding circuit lines is connected through a transistor amplifier, one of which is shown schematically at 102, including the line 90 for which the amplifier 102–L is shown in FIG. 6. The seven selection output lines pass through cable 105 to the character selector circuit 108. This circuit is controlled by the code reading photocells 110, as more fully explained in said Patent No. 3,059,219, and the character selector circuit in turn controls the function of a spark control unit 112 and a flash control unit 113.

These units are separate triggering circuits, the spark control unit being connected to the electrodes 115 to cause a spark to jump the gap therebetween and produce an instantaneous flash of light when the desired character passes the projection station, indicated by the dot-dash line 116 which shows the optical axis of the system.

Rotating continuously at fairly high speed, e.g., 2400 r.p.m. across the optical or projection path, is the character disc 120 which is preferably an opaque plate-like member having the individual characters formed as transparencies such that a shaped light beam is formed by the light passing through the selected character. The timing of the flash is of course precise and of such short duration that the character image bearing light beam is effectively stationary. This beam passes through the font selector prism system 122, as described in U.S. Patent No. 3,099,945, and thence through the size controlling lenses 125. From these lenses the character image bearing beam passes through an optical flat 127, or the like, which may be pivoted between two positions by the space controller solenoid 128, as described in said U.S. Patent No. 3,183,806, and thence the image is focused on the photosensitive material 130, which may be film or paper draped over and controlled by the spacing carriage 132. This carriage is moved transversely to the optical system by the spacing control motor 57 through the rack and pinion drive 133. Leading movements of the photosensitive material, i.e., vertically, are provided through the elongated gear 134 driven from the leading control motor 67.

As soon as a character image is recorded on the photosensitive material, spacing movement of this material is provided by the controlling motor 57. Information for this purpose is derived from the character unit width code or data on the disc 120. This code is read by flashing the elongated light tube 140 under control of the flash unit 113, at the same time that the character is photographed. A unit width code is thus projected to the bank of code reading photocells 142, and their outputs are fed through cable 144 to the space computer 145. This computer is provided with a control flip-flop FF4 and a pulse generator 146, and which includes a separate input through cable 150 from a drum type selector switch 152 which is coupled to the lens positioning controller 154, these parts in turn being under control of the size control circuit 95.

As is explained in greater detail in U.S. Patent No. 3,141,395 the result is a burst of electronic spacing pulses which are transmitted along the spacing circuit line 148 to the space control circuit 55. The number of these pulses is related to the actual width to be alloted to the character image just photographed, in terms of picas and fractions of a pica, or piclets.

It should be noted also in connection with FIG. 1 that there is a second character disc 120*a*, and it may be moved alternatively into the optical system under control of a disc shifting apparatus 155 which is driven by disc shifting pneumatic cylinders, one of which is shown at 156. Operation of these cylinders is controlled by a disc change control circuit 160 operating from signals passing through cable 162 which leads the decoder circuit 30.

In explaining the tabulating and leader insert controls, it is desirable to mention certain features of the operation of the photographic machine. Thus, with reference to FIG. 1, and as previously mentioned, when a control tape 10 is fed into the readers 12 and 15, the reader 12 passes over code words except the end-of-line codes, and when one of these codes appears to the reader 12, it stops and maintains this code in a reading position. The tape in the meantime builds up as a loop between the two readers, and when the reader 12 reaches the end-of-line code for an acceptable line, it sends a "go ahead signal" to the reader 15 which in turn proceeds to read all of the code words, one at a time.

Each time the reader 15 reads a code word it transmits the appropriate code to the character decoder circuit 30, and as an incident to this operation a tape step signal is sent to the reader and the reader steps to the next code and waits. In the meantime, the decoder circuit operates to determine whether a character selection code or a function control code is presented, and routes the information accordingly either to the character selector or to the appropriate one of the function control circuits. Among these circuits is the tabulate circuit 95. As soon as the character selection operation, or the function operation is complete, then a signal is transmitted to the character decoder which in turn generates a "tape read" pulse or signal to the reader 15.

The read pulse amplifier 170, shown schematically in FIG. 2, has an input 171 through which the feed back or "go ahead" pulse is received, and has two separate output lines 172 and 173 which both transmit the tape read pulse. Line 172 leads to the common connection of the first seven stations of the reader and line 173 leads to a stepping switch in the size control circuit 175. Since all operations of the machine require an output pulse through either the 8 or $\bar{8}$ line of the character decoder (not FIG. 2), normal operation of the machine is suspended for the automatic size change function by interrupting the read pulse circuit to the common input of the eighth station (*84h*) of the reader. The details of this operation are not important to details of this invention. Thus, for purposes of explanation it can be assumed that an output read pulse over line 172 is accompanied by a simultaneous read pulse through line 173.

*Tabulate*

One feature of the invention is to cause automatic tabulating operations. When a tabulate code appears in reader 15, a read pulse will cause an output from line 92 of decoder circuit 30, and this output leads to the control flip-flop circuit FF–T. This input sets this flip-flop to its "on" state and it in turn sends an "on" signal through buffer amplifier circuit 180 to send an "on" signal to pulse generator 182. This pulse generator can be an astable multivibrator which when triggered on will continue to generate pulses until it is turned off.

These pulses pass through amplifier 184 to a further amplifier 185, which is incorporated in the justification computer 48. Pulses from amplifier are directed to the line 50 to the space control 55, and thus cause the stepping motor 57 to begin stepping the film carriage 132. For every fourth pulse sent to the stepping motor, the space control also sends a corresponding pulse to a binary counter 185, comprising the stages B–1 and B–2. For every fourth pulse transmitted to B–1, there will be an output on line 188 (FIGS. 5 and 6) which corresponds in this example to spacing of one-half pica.

These output pulses from B–2 are transmitted to the control flip-flop FF–T, through line 189, thus turning this flip-flop "off," and as it returns to its off state, it sends a pulse through line 190 to the read pulse amplifier 170, causing the reader to read the code then present and advance to the next code on the tape. This causes the next tabulate code to be read, and the sequence is repeated with an "on" pulse being received over line 92 at the control flip-flop FF–T each time a further tabulate code is read.

*Leader-tabulate*

Figure 4:
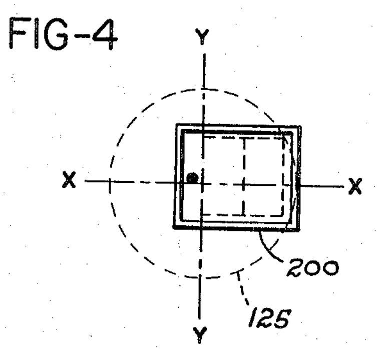
FIG. 4 is a diagram showing the character field of the machine superimposed on the outline of one of the lenses of the photographic system, and particularly illustrating a preferred location of the leader characters with respect to the character field.

Another function of the present invention is to provide for the insertion of leader characters in tabulating operation. For example, it may be desired to insert dots or dashes from the end of the characters in one column to the point where the next column begins. For purposes of explanation, a leader dot will be described. This dot is obtained from a suitable pi character on the pi character plate 200 (FIG. 3), and this dot is located on the pi character plate to the lefthand side of the vertical line which defines the beginning edge of the normal character field. This relationship is shown in FIG. 4, wherein the character field position is illustrated superimposed in dotted lines on a lens of the optical system, with the horizontal and vertical center lines of the optical system being indicated by the dot-dash lines X—X and Y—Y. It will be understood that the intersection of these lines is at the center of the optical path 116 shown in FIG. 1.

As shown in FIGS. 2 and 6, when the character reader 15 reaches a leader code instructing the insertion of leaders, this will produce an output from character decoder circuit 30 on line 90 via the amplifier 102–L. The output pulse from this amplifier is transmitted through line 201 of the leader control circuit to the grid of thyratron 205, causing this thyratron to fire. As a result, a circuit is completed through the latching coil 210–L of a leader control latching relay 210. As is characteristic with this type of relay, there is also an unlatch coil 210–U, and energizing of the appropriate coil will cause the relay to shift and remain in that position to which it has been shifted until the other coil is energized.

The switches of this relay are identified as 210*b*, 210*c*, 210*d*, 210*e*, and 210*f*. Corresponding contacts for each relay switch are identified by the suffix C (for common), U (for unlatched position contact), and L (for the contact which is closed in the latched position). Relay switch **210*b* is connected between the plate circuit of thyratron 205 and one of the other of the relay coils 210–L and 210–U. The normal position is as shown in FIG. 6, hence when thyratron fires due to a leader signal input pulse on line 201, all of the relay switches transfer, and as a result thyratron is extinguished when switch 210*b* leaves the contact 210**–LU.

At the same time the thyratron is fired, it transmits a pulse through line 212 to an OR gate circuit 215, and this line also leads to the leader insert control flip-flop FF–L. A pulse from line 212 sets the circuit FF–L to its off condition. The pulse passing through OR gate 215 is directed through a delay circuit 217 to the control for reader 15, producing an output from the read pulse circuit 171 (FIG. 2) which in turn directs a read pulse through the decoder circuit 30. It will be recalled that any read pulse to the reader also causes it to step to the next code in readiness for the next operation, hence the code in the reader at the time of the read or "go-ahead" pulse through OR gate 215 is the next code following the leader code, which resulted in an input through line 201 to fire the leader insert thyratron.

Figure 3:
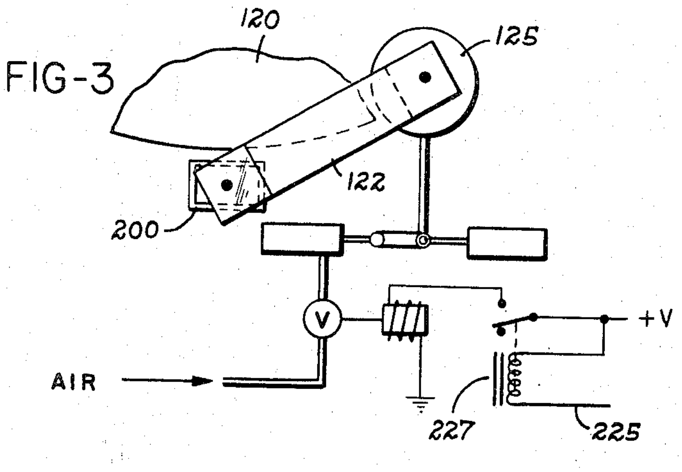
FIG. 3 is a detail view showing the relationship of one of the character matrix discs, the font selecting prism, and the pi character carrier.

In this particular mode of operation a number of tabulate codes will follow the leader code. Therefore, the operation will proceed essentially as previously described in the tabulate function. However, each time the counter binary B–2 emits a negative pulse when it transfers from "1" to "0" state, this is transmitted through line 220 to the relay switch **210*e*, which is now in its latch position. This pulse is directed through the contact 210*e*–L into the "set" or "on" inputs of the leader control flip-flop FF–L and to the leader insert control gate 222–G. This input is provided through line 223. As soon as the relay 210 transfers to its latch position, a ground circuit is completed through the relay switch 210*d* and line 225 to the pi relay 227 on the position control for the font selector prisms 122. This causes the prisms to be moved to the pi character position, as shown in FIG. 3 so that a flash of light from the spark gap 115** will be directed through the pi character plate.

The negative pulse from B–2 through line 220 sets the leader control FF–L to its "on" condition, and when this control flip-flop circuit is on, it enables the gate circuit 222–G through the connection 224. This gate circuit will be enabled by positive pulses from line 223. Therefore, when the counter 185 runs over (B–2 changes from one to zero) the first time after the leader circuits have been set up, this will cause the leader control flip-flop FF–L to be switched on and enable the leader insert gate 222–G. However, the feedback pulse through line 189 will momentarily turn off the tabulate control flip-flop FF–T and cause the next code to be read at the reader 15. This will also be a tabulate code, hence the sequence will be repeated, but during the next sequence when B–2 changes from its zero to one state, a positive pulse will pass through lines 220 and 223, and this positive pulse will enable the gate circuit 220 and 222–G and thus a pulse will result on the output line 230 to the spark control unit 112, resulting in a flash of light which will cause the leader character to be photographed.

It is significant to note that this will occur one-half way through the tabulating operation, following the first operation which set up the leader insert control FF–L. In other words, the pulse which changed B–2 to its one state occurs when a spacing of one-quarter of a pica has occurred from the time the tabulated counter 185 first overflowed. Therefore, if the leader code occurred at a time when the counter 185 was almost full, for example less than one pulse, the next pulse resulting from reading of the tabulating code immediately after the leader code will operate merely to set up the leader insert control, and it will not be until one-half way through the next following tabulate operation that the first leader dot will be actually photographed and inserted. Therefore, the minimum spacing that a leader character will have from a preceding character will be one-quarter pica, and the maximum possible such spacing will be three-quarters of a pica, in that instance where the counter 185 has not yet received any spacing pulses when the leader code appeared.

The leader-tabulate operation is completed by the insertion of another leader code at the end of the tabulate codes. When this final leader code appears at reader 15, the character decoder circuits 30 will cause a further signal through amplifier 102–L and line 201 to fire the thyratron 205. This time, however, the relay switch **210*b* will be in the latching position (i.e., on contact 210*b*–L), and the result will be energization of the unlatch coil 210–U to transfer the leader insert latching relay 210** back to its unlatched position shown in FIG. 6, thereby terminating the leader operation.

A safety circuit is provided, in the event that the keyboard operator preparing the control tape or other record should neglect to insert a further or ending leader code when tabulating to the end of a line. It is possible that this can occur where the operator has performed the leader-tabulate function out to the end of the line, and from source of habit, merely adds the end-of-line code. In the event that the machine is in the leader-tabulate mode and an end-of-line signal occurs, this signal will be transmitted over the line 232 and through the isolating diode 233 to the contact **210*c*–L of the latching relay 210. Since the relay will be in its latch position, this signal will be carried through line 235 to the grid circuit of thyratron 205, causing it to fire and thus transferring relay 210 to its unlatched position. Obviously, if a terminating leader code has been inserted, the latching relay will already have transferred as previously mentioned, and the signal over line 232 will terminate at the open contact of relay switch 210*c***.

*Leader—justified word space*

Another function of the present invention is to insert leader characters between words or phrases which are to be flush with the beginning and ending margins in a column, but where a substantial space is desired between these words or phrases. For purposes of explanation, it will be assumed that a single word should be formed flush with the lefthand margin of a column, followed by a space filled with leader dots, followed by a final word which ends flush with a predetermined righthand margin. It will be understood that in place of these single words at the beginning and end of a line, phrases of several words can also be formed.

The general scheme of operation of the machine in performing this function, aside from the insertion of leader characters, is described in U.S. Patent No. 2,714,-843. Basically, the operation consists of forming the first word or phrase at the beginning of the line, and if it is a phrase, inserting standard space codes between words, then following this first word or phrase with a justified word space code (JWS, see FIG. 2) followed by the final word or phrase, with appropriate standard spaces between words if there is more than one. Due to the fact that the end-of-line (EOL) code includes in code form the number of justified word spaces and the amount of space to be divided up among these justified word spaces, this information to be stored in the justification computer 48, as previously mentioned. In the example set forth above, there will be only one justified word space, hence the line remainder space set into the justification computer will all be inserted at this one space, i.e., between the words or phrases as desired.

Therefore, if it is desirable to fill this space with leader characters, a leader code will be inserted ahead of the justified word code. The leader code will result in a signal through line 201 to energize thyratron 205, as described before, and the leader insert latching relay 210 will shift to its latch position. This will result in setting the leader insert control flip-flop FF–L to its off condition, and the tape read or go ahead pulse will be generated via line 212, OR gate 215, delay circuit 217, and the read pulse circuit 170. Thus, with the font selector prism in the pi character position, and the leader insert circuits ready to receive pulses from counter 185, the justification computer 48 will begin operation as the JWS signal is read.

Pulses from the justification computer 45 will be transmitted via line 50 (FIG. 1) into the space control circuits 55, and the stepping motor 57 will be driven accordingly. The counter 185 will follow along, and the outputs from its stage B–2 will function to control the leader insert flip-flop FF–L and the leader insert gate 222–G in the same manner as previously described, so that the spark control unit will receive an energizing pulse at half-pica intervals after the first leader insert output signal on line 230. Stated another way, the spark will be fired at half-pica intervals, but from the quarter pica pulses into counter 185. When the justification computer completes its operation, it will send a signal over line 240, and since relay 210 is in the latched position, this signal will energize thyratron 205 and in turn energize the unlatch relay 210–U. With the relay then returned to its unlatched position the "finished justification" signal is applied through line 242 from the justification computer, and via relay switch 210–F to line 243 which causes the actuation of the read pulse circuit 170, whereby the reader reads the next code in the tape and begins to compose the next word.

The present invention, therefore, provides for the automatic and accurate insertion of any desired form of leader character in phototypesetting apparatus, in different modes of operation, involving both tabular work where two or more columns are to be formed with each column having a common lefthand margin, or where it is desired that columns be formed having justification, e.g., an even righthand margin. In all instances, the control over the phototypesetting machine can be completely automatic from a control record such as a perforated tape or the like.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a phototypesetting machine, a tabulating device including means for generating a code directing a tabulating function and a plurality of further codes each directing a spacing operation of predetermined amount the total number of which additional codes corresponds to the space required for the tabulating operation, means defining an optical path along which character images are projected in predetermined order, means for supporting photosensitive material to receive the projected images, means for selecting the order of characters to be projected and for selecting other functions of the machine including a tabulating function to produce lines of composition, spacer means connected to produce relative spacing movement between said supporting means and the optical path according to the widths of the projected images, selectively operable character spacing pulse generating means connected to supply pulses corresponding to desired spacing movements to said spacer means, separate generating means normally inoperative and adapted when operative to supply pulses to said spacer means, a tabulating circuit responsive to a code directing a tabulating function and connected to actuate said separate generating means to operative condition, and additional circuit means responsive to each of said additional codes to cause said separate pulse generating means to supply a predetermined number of pulses to said spacer means in response to each of said additional codes to complete the directed spacing operation for a tabulating function.

2. In a phototypesetting machine including means defining an optical path along which character images are projected in predetermined order, means for supporting photosensitive material to receive the projected images, means for selecting the order of characters to be projected and for selecting other functions of the machine including a tabulating function to produce lines of composition, and spacer means connected to produce relative spacing movement between said supporting means and the optical path according to the widths of the projected images; the improvement comprising a selectively operable pulse generator connected to supply pulses corresponding to desired spacing movements different from character spacing movement to said spacer means, means operable by said selecting means to generate a tabulating code, and gating controls operative by said tabulating code generating means and connected to actuate said pulse generator, means operative to additional space indicating codes connected to cause said pulse generator to supply a predetermined number of pulses to said spacer means in response to each space indicating code following a tabulating function code.

3. In a phototypesetting machine including a character matrix having at least one font of master characters, means defining an optical path along which character images are projected from said matrix in predetermined order, means including a pi character support arranged to direct an image of a pi character along said optical path, means for supporting photosensitive material to receive the projected images, means for selecting the order of characters to be projected and for selecting other functions of the machine including a leader insertion function to produce lines of composition, and spacer means connected to produce relative spacing movement between said supporting means and the optical path according to the widths of the projected images; the improvement comprising pulse generating means connected to supply pulses corresponding to desired spacing movements to said spacer means, means operable by said selecting means to generate a leader insertion code, and gating controls operative by said leader insertion code generating means and connected to cause said pulse generating means to supply a predetermined number of space indicating pulses to said spacer means in response to a code directing a leader insertion function.

4. The improvement in a phototypesetting machine as defined in claim 3, wherein means are provided for generating a code directing a tabulating function, and wherein said gating controls are further operative by said tabulating code generating means to cause the continued photographing of a pi character in said support means for each subsequent tabulating code to reproduce leader characters in regularly spaced relation according to the tabulating function directed.

5. The improvement in a phototypesetting machine as defined in claim 3 including a justifying computer operable to produce pulses to operate said spacer means in accordance with the amount of interword spacing desired in a justified line of composition, and a connection between said gating controls and said justifying computer operative to photograph successively in regularly spaced relation a leader character from said pi character support during operation of said justifying computer to produce an extended succession of leader characters in a justified line.

References Cited

UNITED STATES PATENTS

| | | | |
|---|---|---|---|
| 2,923,215 | 2/1960 | Corrado | 95—4.5 |
| 3,099,945 | 8/1963 | O'Brien | 95—4.5 |
| 3,274,909 | 9/1966 | Hauerbach | 95—4.5 |

JOHN M. HORAN, *Primary Examiner.*

NORTON ANSHER, *Examiner.*